US00RE38732E

(19) United States
(12) Reissued Patent
Wood et al.

(10) Patent Number: US RE38,732 E
(45) Date of Reissued Patent: May 10, 2005

(54) PRINTING SYSTEM AND METHOD

(75) Inventors: Patrick H. Wood, Hopatocon, NJ (US); Stephen Kochan, Kinnelon, NJ (US)

(73) Assignee: Electronics for Imaging, Inc., Foster City, CA (US)

(21) Appl. No.: 09/552,108

(22) Filed: Apr. 18, 2000

Related U.S. Patent Documents

Reissue of:
(64) Patent No.: 5,150,454
Issued: Sep. 22, 1992
Appl. No.: 07/777,065
Filed: Oct. 16, 1991

U.S. Applications:
(63) Continuation of application No. 08/310,249, filed on Sep. 21, 1994, now Pat. No. Re. 36,947.

(51) Int. Cl.[7] ..... G06K 15/00
(52) U.S. Cl. ..... 358/1.15; 358/1.18
(58) Field of Search ..... 358/1.3, 1.13, 358/1.14, 1.15, 1.6, 1.18, 296, 261.1, 261.2, 261.3, 261.4, 426–427, 448, 450, 453, 460, 462, 431–433, 467; 382/322–323, 254, 264; 345/202–203, 507, 516

(56) References Cited

U.S. PATENT DOCUMENTS 3,921,135 A * 11/1975 Komaru et al. ... 340/146.3 MA
4,725,815 A * 2/1988 Mitchell et al. ..... 358/261
4,791,680 A * 12/1988 Yokoe ..... 382/56
5,068,805 A * 11/1991 Tsazuki ..... 395/164
5,150,454 A * 9/1992 Wood et al. ..... 358/1.15
5,206,735 A * 4/1993 Gauronski et al. ..... 358/296
RE36,947 E * 11/2000 Wood et al. ..... 358/1.15

* cited by examiner

*Primary Examiner*—Arthur G. Evans

(57) ABSTRACT

A image is printed from a source of drawing instructions. The image is reducible to pixels arranged in a plurality of ranked image lines. The system employs a storage device having compressed and uncompressed regions. Each region has a designated capacity and each is arranged to store pixels of one or more of the plurality of image lines. A drawing processor is coupled to the storage device and can be coupled to the source of drawing instructions for responding thereto. This drawing processor can store new pixels in the storage device for successively selected ones of the image lines. The drawing processor has a conditional device, a decompression device and an insertion device. The conditional device can compressively encode and move from the uncompressed region to the compressed region, a remote one of the image lines, if: a) the selected one of the image lines is in the compressed region, and b) the uncompressed region has reached its designated capacity. The decompression device can expansively decode the selected one of the image lines, if located in the compressed region. The insertion device can insert one or more new pixels according to the drawing instructions into the selected one of the image lines by storing the selected one in the uncompressed region. The printing system also has a printing engine coupled to the storage device for printing the plurality of image lines in rank order, decompressing compressed ones of the image lines from the compressed region before printing.

2 Claims, 4 Drawing Sheets

10
MAIN CPU
12
MEMORY
14
I/O
18
PRINTER
20
CONSOLE
16
LOCAL CPU
24
I/O
30
LATCH
28
MEMORY
26
PRINTER
22
22

32
PRINTER CPU
33
34
EEPROM
ROM
36
RAM
38
20
44
PRINTER ENGINE
REGISTERS/ CONTROLLER
42
SERIAL COMMUN.
40

FIG. 3
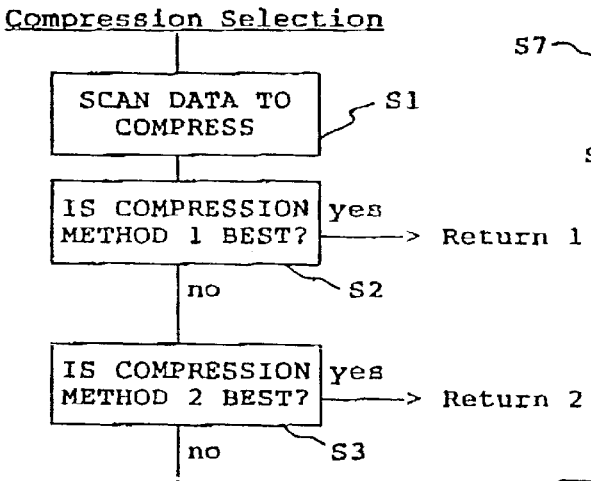
FIG. 4
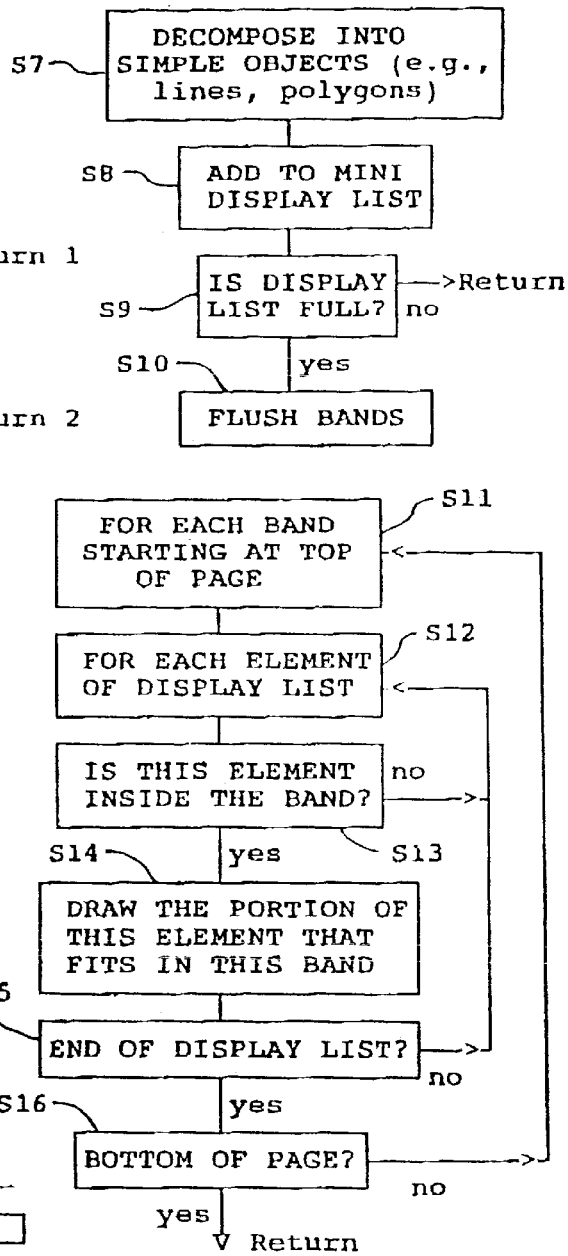
FIG. 5

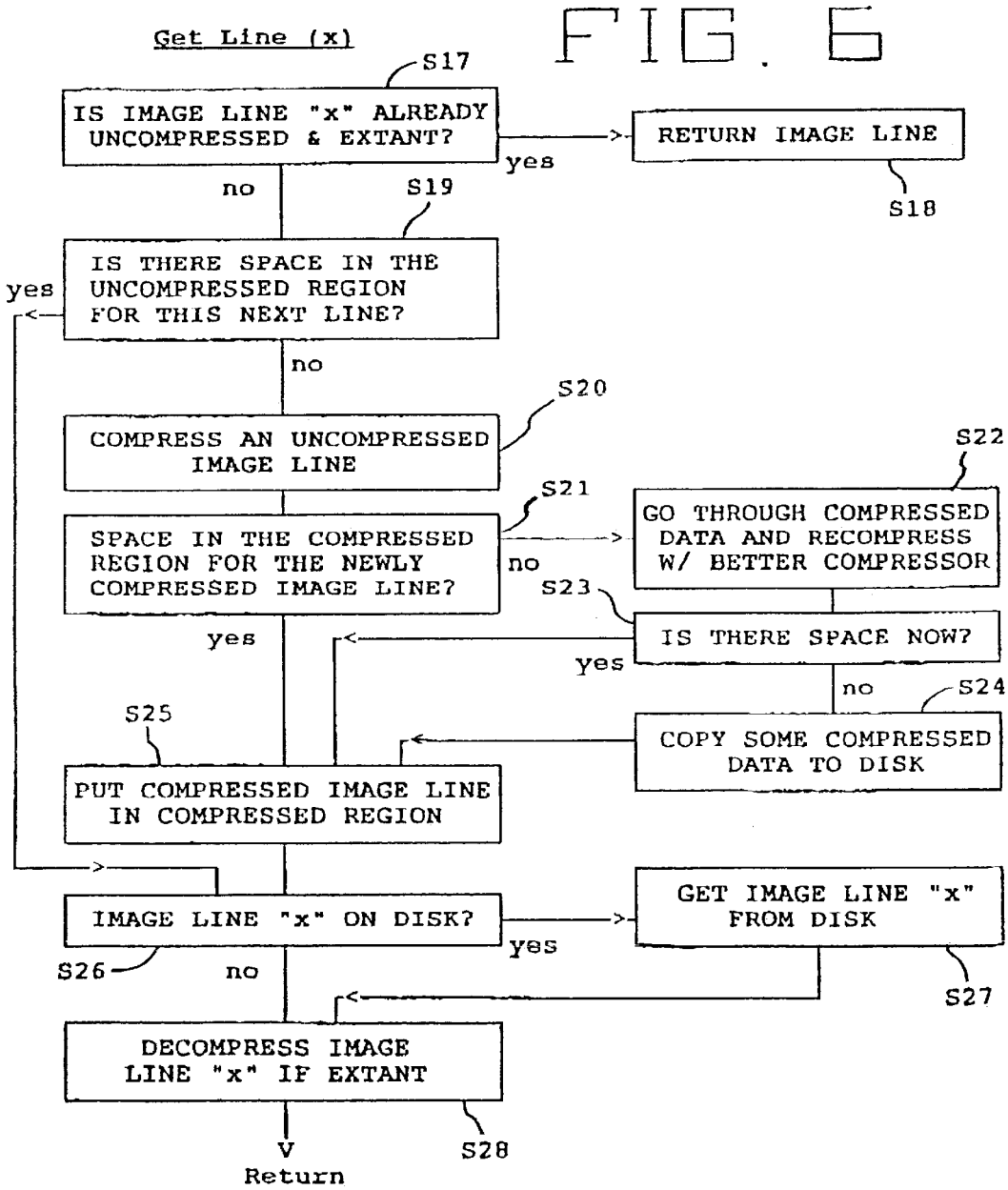
FIG. 6
Get Line (x)
S17
IS IMAGE LINE "x" ALREADY UNCOMPRESSED & EXTANT?
yes
RETURN IMAGE LINE
S18
no
S19
IS THERE SPACE IN THE UNCOMPRESSED REGION FOR THIS NEXT LINE?
yes
no
S20
COMPRESS AN UNCOMPRESSED IMAGE LINE
S21
SPACE IN THE COMPRESSED REGION FOR THE NEWLY COMPRESSED IMAGE LINE?
no
S22
GO THROUGH COMPRESSED DATA AND RECOMPRESS W/ BETTER COMPRESSOR
S23
IS THERE SPACE NOW?
yes
yes
no
S24
COPY SOME COMPRESSED DATA TO DISK
S25
PUT COMPRESSED IMAGE LINE IN COMPRESSED REGION
IMAGE LINE "x" ON DISK?
yes
GET IMAGE LINE "x" FROM DISK
S26
no
S27
DECOMPRESS IMAGE LINE "x" IF EXTANT
S28
Return FIG. 7
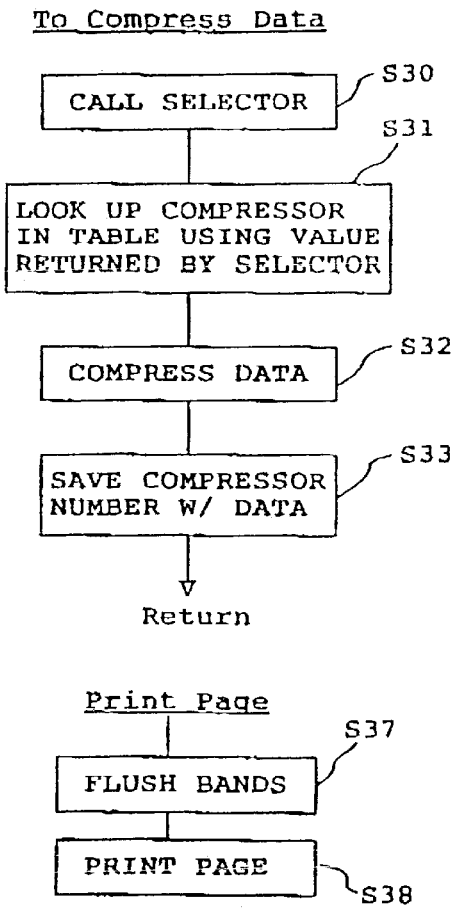
FIG. 8
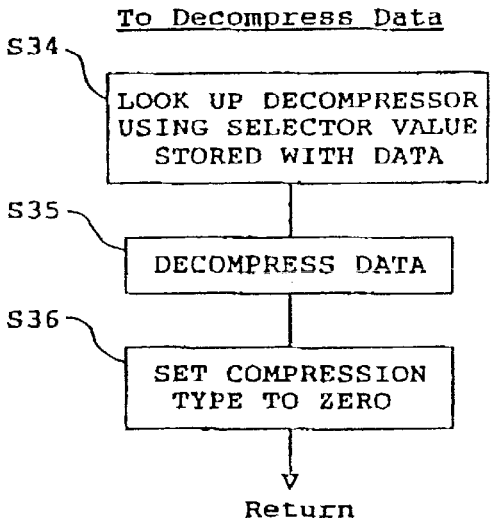
FIG. 9
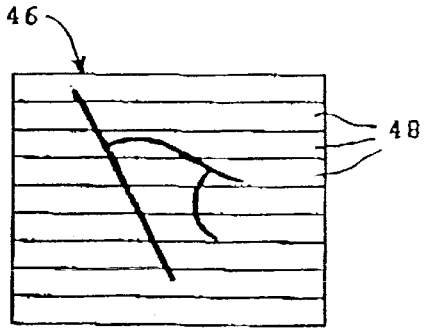
FIG. 10

PRINTING SYSTEM AND METHOD

Matter enclosed in heavy brackets [ ] appears in the original patent but forms no part of this reissue specification; matter printed in italics indicates the additions made by reissue.

*REFERENCE TO RELATED APPLICATIONS*

*This application is a continuation of U.S. Reissue application Ser. No. 08/310,249, filed 21 Sep. 1994, now U.S. Pat. No. RE36,947.*

BACKGROUND OF THE INVENTION

The present invention relates to printing systems and methods and, in particular, to apparatus and techniques for printing an image with a reduced need for memory.

A laser printer can be a fairly complex device having a self-contained computer system, usually referred to as a microprocessor based controller. The controller can have a microprocessor, 1 Mb of read only memory (ROM) and 2 Mb of random access memory (RAM). In many installations, the personal computer driving the laser printer may be slower and have less memory than the printer. Moreover, some sophisticated laser printers may employ a hard disk for handling complicated, high definition images.

Some laser printers include an interpreter that can respond to drawing commands such as: draw a line from point $x_1$, $y_1$ to point $x_2$, $y_2$. Even more sophisticated programming languages have been incorporated in ROM in some printers. Some fairly rich programming languages employ variables, looping, flow control, procedures (subroutines), arithmetic operations and most of the features offered by programming languages such as Basic or C. Accordingly, programs designed to drive such a sophisticated printer need only send programming commands, which then are interpreted by the printer to produce a two dimensional image.

When converting these programming instructions into an image, such a printer can produce a bit map image, that is, a pixel by pixel representation of the printed page. The term pixel refers to a small picture element, or its digital representation, large identical numbers of which are arranged to form an image. The bit map image is typically organized into a plurality of image lines each having none to many pixels. With such an organization a monochrome image at 300 dots per inch, on a 8.5" by 11" page, requires about 1 Mb of memory. The memory requirement quickly escalates for color or higher definition images.

Because of this high memory requirement, various techniques have been employed to reduce the memory demand. One known approach involves compressing the digital data in the image lines. For example, an image line may have a large amount of "white" space represented by an interval with repeating identical data bytes. Accordingly, these repeating bytes can be reduced to a code indicating the number of repetitions and the byte repeated.

Known compression techniques also include predictive encoding. Input data is scanned for repeated bytes, but is also scanned for consecutive bytes that differ by +/− 1 bit from the previous byte. The compression code requires only two bytes for repeats up to 63 and three bytes for all others. Slowly varying bit patterns are common for certain types of graphics and this predictive encoding works well with this type of information. Predictive encoding has also been employed with look up tables and binary arithmetic coding. This type of encoding can produce a very dense compression.

Other known compression techniques have been published under the JPEG Standard, such as the discrete cosine transform. This transform guarantees a certain amount of compression, which can be arbitrarily set at the time compression begins. The compression ratio can be set arbitrarily high, but will eventually cause a loss of visual detail, which may or may not be acceptable depending upon the application. At compression ratios 3:1 or 4:1 very little visual detail is lost.

An unsophisticated approach to reducing the memory requirements would be to prepare a data bit map with every stored image line compressed. With this process an image is normally assembled line by line, requiring the controller to revise image lines many times. The resulting difficulty is the large amount of time spent compressing and decompressing image lines as the image is assembled.

When all of the data is compressed at the computer and sent compressed to the printer, large amounts of memory are required at the computer, but not at the printer. Requiring that the printer decompress every line of the image can slow the printing process unacceptably.

For example, U.S. Pat. No. 4,901,248 shows a scheme for compressing alphanumeric data being sent to a printer. Space codes are nullified and pitch data corresponding to the space code is added instead. In another example, U.S. Pat. No. 4,641,263 shows a microprocessor used to emulate a local parallel printer. This microprocessor compresses the print data and transmits it serially for decompression at a remote printer. Other known techniques can magnify type fonts so that different sizes can be printed (see for example, U.S. Pat. Nos. 4,367,533 and 4,879,666; as well as U.S. Pat. No. 4,278,359 for adjusting the lateral velocity of a dot matrix printer head).

Another known technique is to reduce the relatively high programming commands to a "display list." This display list can be a longer list of simplified directions. For example a circle is listed as a large number of very short lines forming a polygon. Next, a banding technique can be invoked to create a bit image, but only for a horizontal band at the top of the page. The printer engine then starts printing this band while a bit map is being created for a second contiguous band. The total amount of memory required for this method depends on the height of the bands and the amount of memory reserved for the display list. In practice, the display list and bands share memory and the size of the band is determined at print time by the amount of memory that is left.

The difficulty with the banding approach is the need to completely map the next band before the prior band is done printing; otherwise the printer must stop. Although some laser printers can be stopped mid-page, a significant number of existing laser printers should not be stopped at mid-page or a streak or blank gap will form. Thus, for relatively complex images, the banding method is unsatisfactory for general application.

Accordingly, there is a need for a printing system and method that is able to produce an image without interruption, and with a reduced memory demand.

SUMMARY OF THE INVENTION

In accordance with the illustrative embodiments, demonstrating features and advantages of the present invention, there is provided a printing system for printing from a source of drawing instructions a two dimensional image. This two dimensional image is reducible to pixels arranged in a plurality of ranked image lines. The printing system has a storage means with a compressed region and an uncompressed region. Each region has a designated capacity and each is arranged to store pixels of one or more of the plurality of image lines. The system has a drawing means coupled to the storage means and adapted to be coupled to the source of drawing instructions for responding thereto. This drawing means can store new pixels in the storage means for successively selected ones of the image lines. The drawing means includes a conditional means, a decompression means and an insertion means. The conditional means can compressively encode and move from the uncompressed region to the compressed region a remote one of the image lines, if a) the selected one of the image lines is in the compressed region and b) the uncompressed region has reached its designed capacity. The decompression means can expansively decode the selected one of the image lines, if located in the compressed region. The insertion means can insert one or more new pixels according to the drawing instructions into the selected one of the image lines, by storing this selected one in the uncompressed region. The printing system includes a printing means coupled to the storage means for printing the plurality of image lines in ranked order, decompressing compressed ones of the image lines from the compressed region before printing.

A related printing method of the same invention employs a storage means having a compressed region and an uncompressed region for printing from a source of drawing instructions a two dimensional image reducible to pixels arranged in a plurality of ranked image lines. The method includes the step of storing new pixels in the storage means for successively selected ones of the image lines by performing three substeps: First, a remote one of the image lines is compressively encoded and moved from the uncompressed region to the compressed region if a) the selected one of the image lines is in the compressed region, and b) the uncompressed region has reached its capacity. Secondly, this selected one of the image lines is expansively decoded, if located in the compressed region. Thirdly, one or more new pixels is inserted according to the drawing instructions into the selected one of the image lines, by storing the selected one in the uncompressed region. The printing method also includes the step of printing the plurality of the image lines in ranked order, decompressing compressed ones of the image lines from the compressed region before printing.

Accordingly, an improved system or method of the foregoing type can employ a memory with two regions for storing compressed and uncompressed data. When working with detailed commands from an interpreter (such as: draw three specified dots on a specified line) and memory is short, the program will first compress data on lines that are remote from the area where the image is currently being assembled. If the information for the affected line is already compressed, the system will decompress before modifying the line.

In the preferred embodiment, image lines are compressed only to the extent needed to free additional memory for writing new pixels. Accordingly, the region being drawn can remain uncompressed, so that processing occurs quickly.

When thus compressed or decompressed, data are transferred from one designated memory region to the other. The system can employ a table to keep track of where various lines are stored in memory and whether they are compressed or not. In some embodiments, the ratio of the size of the compressed and uncompressed regions can be altered dynamically, depending upon the amount of data and the extent of compression. For example, as space in the compressed region dwindles, the uncompressed region can be reduced to give the compressed region additional memory.

The preferred embodiment employs several compression techniques. At the start, the drawing instructions are examined to estimate the appropriate compression density. The system will typically restrict itself to a limited number of compression techniques that appear appropriate based upon sensed printer parameters, such as paper size, memory capacity etc. The sensed parameters may originate from user identification of the printer, from examination of the drawing instructions, from selection switches on the printer or elsewhere etc. On the other hand, the system can initially check the amount of memory available and may elect not to use any compression techniques if memory is adequate. In one embodiment, data are examined to determine the best compression technique (the best fit for text, graphics, scanned images, etc). For example, for a monochrome image with much text, a facsimile-type compression (CCITT, Group 3) may fit better than a default setting, such as a predictive encoder. Therefore the table entries for a predictive encoder would be replaced with the entries for a facsimile-type encoder/decoder. Regardless, when an image is being later drawn, the compression requests are examined periodically (e.g., after every ten requests) to determine the optimal compression method for current circumstances. Also, denser compression methods can be invoked later to recompress parts of the page, when the overall memory is insufficient to continue.

In one preferred embodiment, high level programming commands are reduced to a display list, that is, a list of simplified but possibly more numerous commands focusing on drawing line segments, for example. The display list is built until it reaches a certain size. Thereafter, the display list is "flushed." Specifically, the display list is executed to draw images on a band by band basis. Thus, the display list will be executed several times, once for each band.

When a particular band is selected, only relevant elements of the display list are executed and only to the extent they affect image lines inside the selected band. This technique is most effective when there are rather large vertical images. Otherwise, a series of commands to draw numerous vertical lines could require every line in the page to be compressed and uncompressed numerous times, once for each vertical line. The display list avoids this time consuming approach by working only with line segments for the current band, where all image lines can remain uncompressed.

In the preferred system, multiple pages can be managed at the same time and color printers requiring three or four colors can be managed separately, as if they were independent pages. Furthermore, a storage disk can be used with the system if memory is inadequate, even after compression is invoked.

Moreover, the above data management can occur invisibly and can be used for any graphics or text oriented application where memory costs are at a premium, with a minimum of modifications to the graphics system.

BRIEF DESCRIPTION OF THE DRAWINGS

The above brief description as well as other objects, features and advantages of the present invention will be more fully appreciated from the following description of presently preferred, but nonetheless illustrative embodiments and from the following drawings, in accordance with the present invention:

FIGS. 3–9 are flowcharts associated with the programming executed by the apparatus of FIGS. 1 or 2.

FIG. 10 is a two dimensional image produced by the printing system and method of the apparatus of FIGS. 1 or 2.

DETAILED DESCRIPTION OF THE PREFERRED EMBODIMENTS

Figure 1:
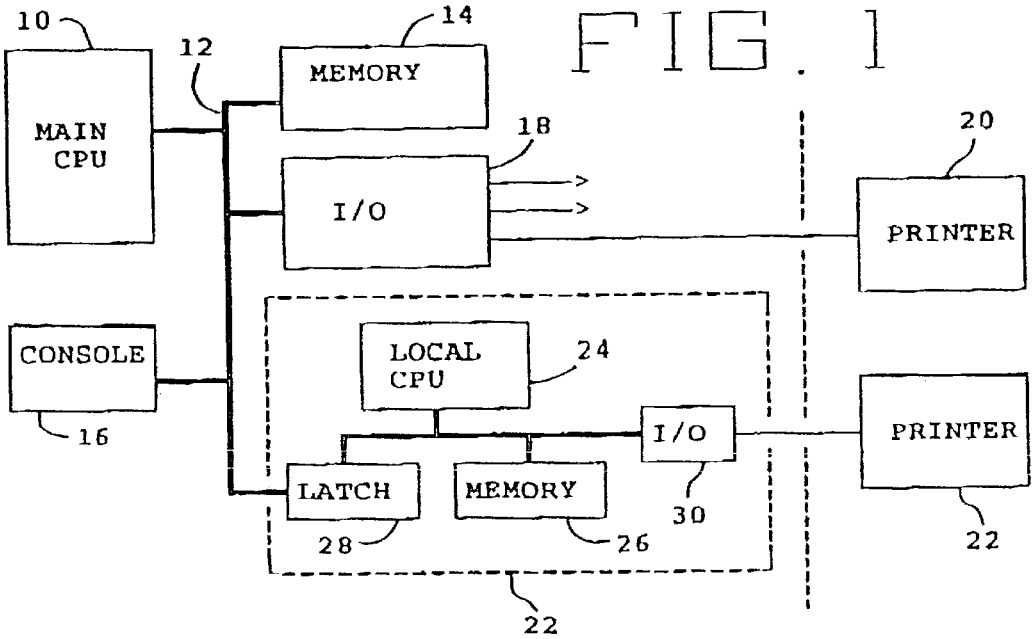
FIG. 1 is a schematic block diagram of a printing system employing a printing method in accordance with the principles of the present invention.

FIG. 1 shows a computer in the form of a main processor 10 connected by bus 12 to a memory 14, console 16 and input/output device 18. Elements 10, 12, 14 and 16 are referred to as a computer assembly. Printer 20 has a printer casing and is connected to an output of device 18. The foregoing elements can be part of a microcomputer, minicomputer or general purpose computer. Alternatively, these components can be replaced with a source that produces digital or other signals representing drawing instructions. These instructions can be high level programming commands or a simplified display list.

The operator can use console 16 to draw a graphic design. Software contained in memory 14 can send instructions through input/output device 18 such as "300 300 250 0 360 ARC STROKE." This instruction specifies an arc centered at coordinates 300, 300, at a radius of 250, drawn from 0 to 360 degrees (a full circle). The outline is "stroked" (as opposed to filled). Printer 20, described hereinafter in further detail, can handle such a high level command. Alternatively, lower level commands in the form of a display list of line segments can be sent to the printer (in some cases an actual bit map will be transmitted).

A separate component subassembly, mounted at frame 22, can also handle high level commands. The elements of frame 22 can be placed on a separate card that plugs into an available slot in a personal computer. Alternatively, the subassembly of frame 22 can be a stand alone component that is hard wired between the main computer and the printer. In this embodiment, frame 22 employs a microprocessor 24. Local microprocessor 24 operates as a drawing means, which as described hereinafter includes a conditional means, decompression means and an insertion means. Microprocessor 24 can be an Intel type 80386, although other microprocessors can work as well. Microprocessor 24 connects through a bus to memory 26, which is a storage means having preferably ROM and RAM type of memory. The RAM can be about 1 MByte, although a greater or lesser amount of memory may be employed, depending upon the application. Latching buffer 28, input/output device 30, and memory 26 are all bused with processor 24. Information is received at the subassembly 22 by means of a latching buffer 28, comprising a number of data latches. Information may be exchanged with conventional printer 22 by input/output device 30. Printer 22 is arranged to receive a full data bit map.

Figure 2:
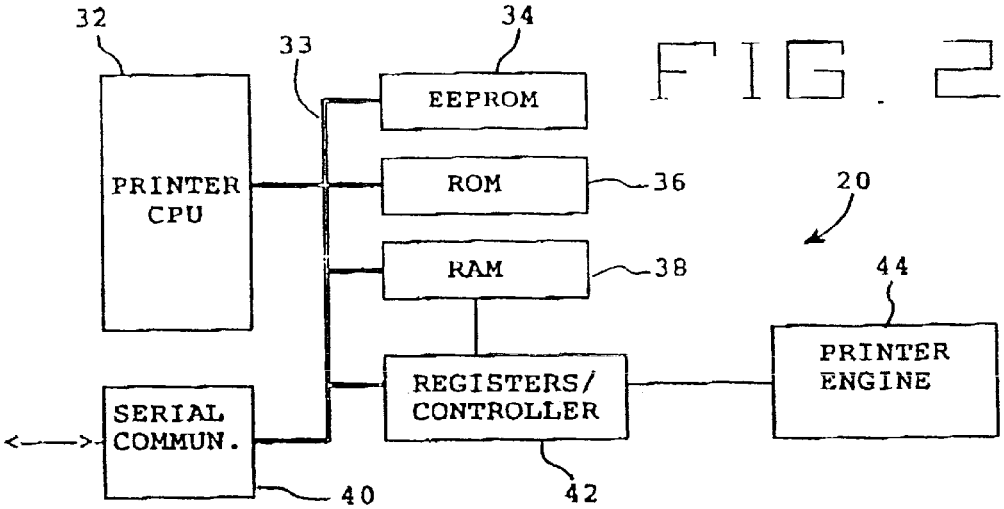
FIG. 2 is a schematic block diagram showing a printing system also in accordance with the principles of the present invention, but also including a source of drawing instructions in the form of a computer.

FIG. 2 shows in further detail the printing system identified in FIG. 1 as printer 20. This printing system employs a printer microprocessor 32, which may be a Motorola type 68000 or other appropriate unit. Microprocessor 32 connects through bus 33 to read only memories, shown herein as EEPROM memory 34 and ROM memory 36. Memory 36 is arranged to produce the programming steps hereinafter described. A storage means is shown herein as RAM type memory 38 also bused with the other memories. Furthermore, memory 38 is partitioned to have a compressed and uncompressed data region also as described hereinafter. Bus 33 also connects to serial communications port 40, which is able to send and receive serial data with respect to bus 33. Registers and data controllers are contained in block 42. These registers are used to temporarily store data for transmission to printer engine 44. Combinational logic contained in block 42 also sends control signals to RAM type memory 38 along the line connecting these two elements.

Printing means 44 can be a laser printer engine having a laser beam that shines on a photosensitive drum upon which toner can be deposited for later transfer to paper by means of a transfer corona and subsequent fusing with fixing rollers (these known subcomponents are not illustrated).

To facilitate an understanding of the principles associated with the foregoing apparatus, its function will be described in connection with the flowcharts of FIGS. 3–9. It will be appreciated, however, that this programming and the associated memory operations could be performed instead with subassembly 22 of FIG. 1.

High level commands are delivered through serial communications port 40 (FIG. 2) and are stored in memory 38. (Although a simplified display list could be sent instead.) The instructions thus stored can be scanned at this time or at later stages as shown in FIG. 3. In step S1 the data is scanned to determine its nature (text, graphics, scanned images etc.) In step S2, the program determines whether the least dense compression technique is satisfactory. If so, this routine returns a "1," otherwise step S3 is executed to determine if the next densest compression method is satisfactory. If so, the routine returns a "2," otherwise similar steps are performed until step S4 is reached to determine if the nth compression method is appropriate. If so, the step returns the assigned number "n," otherwise step S5 is executed. In step S5, the program determines if memory is full. If not, a zero is returned, otherwise the program returns a flag indicating that the densest compressor, the discrete cosine transform of the JPEG standard, is to be used.

This JPEG discrete cosine transform (DCT) is the compression technique of last resort and may only be used in installation lacking a nonvolatile storage. In some embodiments, for example monochrome printers, DCT may not be loaded into the table of permissible compressors. Alternatively, DCT may be loaded but used only when selected by a panel switch, much like the switches for draft/letter quality modes on conventional printers.

Next, the program contained in memory 36 and/or 34 (FIG. 2) determines if the image will be complicated enough to require display list processing. If so, step S7 is executed (FIG. 4). In step S7, high level instructions such as a command to draw a circle, are reduced into simpler commands, such as directions to draw a line or a group of lines such as a polygon. In succeeding step S8, the decomposed instructions are saved in memory (RAM 38 of FIG. 2) as a display list. The process of successively decomposing instructions into a list of simpler directions is sometimes referred to as creating a display list. In step S9, the program determines whether the space allocated for the display list is full. If not, the program continues to increase the display list; otherwise step S10 is executed, in which bands are flushed.

The flushing of bands is illustrated in FIG. 5, starting with step S11, which provides for scanning and rescanning of bands. As shown in FIG. 10, a two dimensional image 46 is broken down into plurality of bands 48. The two dimensional image 46, as well as the bands 48 are each composed of a multiplicity of image lines composed of a series of dots or pixels that compose the image. In step S11 of FIG. 5, the program increments the band number, starting with the first band and indexing to the next band for subsequent passes. Next, in step S12, the program increments the display list number, starting with the first direction on the list and indexing to the next direction on the list for subsequent passes. In step S13, the selected direction of the display list is analyzed to determined if it will affect the current band. If not, step S12 is repeated; otherwise step S14 is executed. In step S14 the current direction of the display list is executed, but only for image lines in the current band. Step S14 involves inserting one or more pixels into the storage means (memory 38 of FIG. 2). If the affected image line is being drawn upon for the first time, the new information is stored in the uncompressed region of memory (memory 38 of FIG. 2). If memory is insufficient to hold this new line, other image lines are compressed and moved to the compressed region of memory in the manner described for FIG. 6. If the affected image line already has information, it is fetched in the manner described hereinafter and then saved in the uncompressed region of memory.

In step S15, the program determines whether the display list has been finished, and if not, step S12 is repeated to increment the display list; otherwise step S16 is executed. In step S16, the processor determines whether the latest band is the last band. If not, step S11 is repeated to increment the band number; otherwise the routine is completed. If control returns to step S11, then the program effectively executes the directions in the display list cyclically.

If the there are more high level instructions that have yet to be reduced to a display list, the steps of FIG. 4 are repeated to produce another display list. If the steps of FIG. 4 are repeated, this amounts to overwriting the display list of directions created during the last pass. The new display list thus created is then drawn as just described in connection with FIG. 5.

The foregoing mentioned saving pixels to memory but did not detail the steps performed should memory become inadequate. As described hereinafter, the program works to clear sufficient space in the uncompressed region of memory (memory 38 of FIG. 2). The memory 38 is segregated into regions for holding: uncompressed image lines of pixels; compressed image lines of pixels; and the display list data. When new pixels are to be written to an image line, the program must determine if the image line exists and if it is assigned to a compressed or uncompressed region. If the relevant line exists in the uncompressed region, pixels can be written on it in a straightforward manner.

If the image line does not exist or is in the storage means, the sequence of FIG. 6 is executed. In step S17, the processor determines whether the image line under consideration exists and is already uncompressed. If so, the line is simply fetched, revised and rewritten into memory (step S18); otherwise step S19 is executed. In step S19, the processor determines whether there is space available in the uncompressed region for the line under consideration. If so, the program jumps to steps S26 et seq., where, as described further hereinafter, the selected line "x" is fetched (possibly from disk) and then expansively decoded; otherwise step S20 is executed.

In step S20, a remote, uncompressed image line is compressed by the program. This involves fetching the uncompressed image line from memory 38 (FIG. 2) and compressing it in a manner to be described further hereinafter. Preferably, more than one line will be compressed at one time. Processing a group of contiguous lines (typically 8, 16 or 32 lines) reduces the amount of tabular information stored and improves speed and density of compression. The group of lines chosen for compression should be remote from the region or band where image processing is now occurring. For example, when drawing at the top of a page, lines can be compressed near the bottom of the page. When drawing towards the end of the page, lines near the top of the page can be compressed. When drawing in the middle of the page, lines near the top and bottom of the page can be compressed.

In step S21, the program determines whether the newly compressed image line can be stored in the compressed region. If space is inadequate, at least some image lines already stored in the compressed region can be reencoded at a higher compression density, as provided in step S22. Specifically, the program has a plurality of compression techniques that compress at different predetermined densities or at a density selected at runtime, which is only limited by the consequential degradation of resolution. Therefore a higher density compressor can be selected in step S22. One or more lines are thus fetched from the compressed region and recompressed.

In following step S23, the program determines whether sufficient space now exists in the compressed region of memory to accept the new image line. If space is still unavailable, a number of other image lines from the compressed region (not the lines just compressed) can be copied to a disk, as indicated in step S24. At the conclusion of step S24, or if the conditions of steps S21 and S23 are affirmative, step S25 is executed next. Steps S21 through S25 act to compressively encode and move remote image lines.

In step S25, the compressed image lines that the program previously considered moving to the compressed region are now successfully moved. According to following step S26, if the image line "x" originally considered by the program is already on a hard disk, that line is fetched, as illustrated by step S27.

Much of the foregoing was concerned with freeing additional space in the uncompressed region of memory. Now that this accommodation has been made, the selected compressed image line is now decompressed and returned for further processing. Step S28 therefore now decodes expansively the selected image line "x." In preferred embodiments more than one line is decompressed at this time. As before, processing a group of contiguous lines (typically 8, 16 or 32 lines) makes the processing more efficient.

As earlier in connection with FIG. 3, the display list or the higher level commands can be initially and subsequently evaluated to determine the appropriate compression density. As shown in FIG. 7, image lines are compressed by calling the selector subroutine, shown herein as step S30, to return the currently designated compression routine. When the compressor value is returned by step S30 (1 to n, or JPEG), the appropriate compressor routine is located through the look up table, as indicated by step S31. Once the appropriate compression subroutine is located, the routine is called by step S32. The consequently compressed image line is then stored in the compressed region of memory in step S33 with a tag to indicate the type of compression invoked.

In FIG. 8, the reverse process, decompression, is illustrated. In step S34, data fetched from the compressed region is examined to determine the compression technique indicated by its tag code. The decompression routine is then looked up based upon this tag. Once the routine is located, the decompression is performed, as indicated by step S35. Thereafter the decompressed data is stored with a zero tag code signifying uncompressed data.

Referring to FIG. 9, the program in step S37 determines if all high level commands have been reduced to a display list and flushed as described before in connection with FIG. 5. When all high level commands have been reduced to a display list which was then flushed in accordance with FIG. 5 the memory (memory 38 of FIG. 2) contains a data bit image that is located in the uncompressed and compressed region of memory. Because some of the image lines are compressed, the demands on memory were reduced. Because some of the image lines are uncompressed, the preprinting processing time was reduced, as already described.

To print this image step S38 is executed, wherein image lines are sent one by one to the printer engine (engine 44 of FIG. 2). Note that display list processing is not relevant at print time. Uncompressed lines are sent for printing in a straightforward manner. Compressed lines are first decompressed as illustrated by FIG. 8. Since decompression (as opposed to display list processing) can be performed quickly, the printer engine can proceed without stopping.

Decompression is handled differently during printing. Since the decompressed data will be used for printing only and not revised by the drawing process, an image line (or group of lines) is decompressed and stored in an area reserved for this purpose, when a page is being printed. This method avoids the time consuming possibility of compressing some other data in the uncompressed region, copying it to disk, etc. Also the decompressed data need not carry the uncompressed tag because recompression will not be ordered when decompressing the next line (or group of lines) solely for the purpose of temporarily storing just before printing. This streamlined decompression proceeds two to three times faster than the previously described decompression performed well before print time.

It is to be appreciated that various modifications may be implemented with respect to the above described preferred embodiments. For example, the various computer and memory types can be altered, depending upon the desired speed, accuracy, resolution etc. Also, the various programming steps can be reordered to execute steps in alternate sequences. Furthermore, in some instances the programming can be simplified to provide fewer compression types or to eliminate the use of a disk for storing image data. Also, the decision to perform banding can be deferred or can be decided immediately after receipt of the high level commands, depending on whether the image complexity demands such processing. Furthermore in some embodiments, banding techniques will not be used and the display list reduction technique will be eliminated as well.

Obviously, many modifications and variations of the present invention are possible in light of the above teachings. It is therefore to be understood that within the scope of the appended claims the invention may be practiced otherwise than as specifically described.

We claim:

[1. A printing system for printing from a source of drawing instructions a two dimensional image reducible to pixels arranged in a plurality of ranked image lines, comprising:

a storage means having a compressed region and an uncompressed region, each having a designated capacity and each being arranged to store pixels of one or more of said plurality of image lines;

drawing means coupled to said storage means and adapted to be coupled to said source of drawing instructions for responding thereto, said drawing means being operable to store new pixels in said storage means for successively selected ones of said image lines, said drawing means including:

(a) conditional means for compressively encoding and moving from said uncompressed region to said compressed region a remote one of said image lines, if (i) the selected one of said image lines is in said compressed region and (ii) said uncompressed region has reached its designated capacity;

(b) decompression means for expansively decoding said selected one of said image lines, if located in said compressed region; and (c) insertion means for inserting one or more new pixels according to said drawing instructions into said selected one of said image lines by storing said selected one in said uncompressed region; and printing means coupled to said storage means for printing said plurality of image lines in rank order, decompressing compressed ones of said image lines from said compressed region before printing.]

[2. A printing system according to claim 1 wherein said drawing means is operable to store in the storage means pixels associated with a full page worth of the instructions, said printing means being operable to await the storage in said storage means of said full page worth of said pixels before printing the image lines of said page.]

[3. A printing system according to claim 2 wherein said decompression means is operable to compressively encode and move from said uncompressed region to said compressed region said remote one of said image lines together with a plurality of other ones of said image lines proximate said remote one, so that lines are moved in groups.]

[4. A printing system according to claim 3 wherein said decompression means is operable to expansively decode and move from said compressed region to said uncompressed region said selected one of said image lines together with a plurality of other ones of said image lines proximate said remote one, so that lines are moved in groups.]

[5. A printing system according to claim 2 wherein said drawing means is operable to successively decompose one or more of the instructions from said source of drawing instructions into a list of simpler directions and store said list in said storage means, said drawing means being operable to numerically limit the instructions to keep said list within a designated size.]

[6. A printing system according to claim 5 wherein said two dimensional image comprises a plurality of contiguous bands and each of the image lines is allocated to a corresponding one of said bands, said drawing means being operable to scan the bands and restrict selection of said image lines to those allocated to a current one of said bands, said drawing means being operable to cyclically execute the directions of said list with a scope limited to storing pixels in the storage means for the image lines contained within the current one of said bands.]

[7. A printing system according to claim 6 wherein said drawing means is operable to overwrite the list of directions by decomposing and storing in said storage means unused ones of the instructions from said source of drawing instructions, said drawing means being operable to rescan the bands and restrict selection of said image lines to those allocated to a current one of said bands, said drawing means being operable to again cyclically execute the latest ones of the directions with a scope limited to storing pixels in the storage means for the image lines contained within the current one of said bands.]

[8. A printing system according to claim 7 wherein said conditional means is operable to compressively encode said image lines at a chosen one of a plurality of encoding densities and is operable to move said image lines to said compressed region with a compression code signifying said chosen one of said encoding densities.]

[9. A printing system according to claim 8 comprising:

means for determining at least one of the characteristics of the image, said drawing means being operable to select said chosen one of said densities in response to said one of the characteristics of said image.]

[10. A printing system according to claim 8 wherein said storage means has a printing region, said printing means being operable to expansively decode said image lines in rank order and store them in said printing region.]

[11. A printing system according to claim 8 wherein said decompression means is operable to store said selected one of said image lines after decompression in said uncompressed region with an uncompressed code signifying a lack of compression, said printing means being operable to store said image lines in said printing region without a code signifying a lack of compression.]

[12. A printing system according to claim 8 wherein said storage means is volatile and has a total capacity insufficient to hold all of said image lines uncompressed, the densest one of said encoding densities having the capability of reducing the resolution of the two dimensional image and storing it at a density that enables storage in said storage means of all of said image lines, without regard to the number and arrangement of pixels in said image lines, so that nonvolatile memory is unneeded for storing said image lines.]

[13. A printing system according to claim 8 wherein said decompression means is operable to sense the compression code and in response thereto expansively decode said selected one of said image lines with respect to said chosen one of said encoding densities.]

[14. A printing system according to claim 13 wherein said conditional means is operable if said compressed region has reached its designated capacity to compressively re-encode at least some of the image lines in said compressed region at a denser one of said densities.]

[15. A printing system according to claim 13 further comprising a non-volatile memory coupled to said drawing means, said conditional means being operable to move at least some of the image lines in said compressed region to said non-volatile memory, if said compressed region has reached its designated capacity and the image lines in said compressed region are encoded at the densest permissible one of said densities.]

[16. A printing system according to claim 13 further comprising a non-volatile memory coupled to said drawing means, said conditional means being operable to move at least some of the image lines in said compressed region to said non-volatile memory, if said compressed region has reached its designated capacity.]

[17. A printing system according to claim 16 wherein said decompression means is operable to expansively decode said selected one of said image lines, if located in said non-volatile memory.]

[18. A printing system according to claim 2 wherein said drawing means is operable to change the ratio of the capacities of said compressed and said uncompressed regions by redesignating portions of one in favor of the other in response to the availability of storage space in one or more of the regions of said storage means.]

[19. A printing system according to claim 2 wherein said conditional means is operable to compressively encode said image lines at a chosen one of a plurality of encoding densities and is operable to move said image lines to said compressed region with a compression code signifying said chosen one of said encoding densities, said drawing means being operable to change the ratio of the capacities of said compressed and said uncompressed regions by redesignating portions of one in favor of the other in response to the choosing of the chosen one of said encoding densities.]

[20. A printing system according to claim 2 wherein said drawing means is operable to change the ratio of the capacities of said compressed and said uncompressed regions by redesignating portions of one in favor of the other in response to the size of page to be printed by said printing means.]

[21. A printing system according to claim 1 wherein said source of drawing instructions comprises a computer assembly having a processor and a computer memory spaced and packaged separately from said storage means, said drawing means and said printing means.]

[22. A printing system according to claim 21 further comprising:

a printer casing containing said storage means, said drawing means and said printing means.]

[23. A printing system according to claim 6 wherein said source of drawing instructions comprises a computer assembly having a processor and a computer memory spaced and packaged separately from said storage means, said drawing means and said printing means.]

[24. A printing system according to claim 1 wherein said source of drawing instructions includes a computer assembly having a processor and a computer memory spaced and packaged separately from said printing means, said printing system further comprising:

a frame attached to said computer assembly for supporting said drawing means and said storage means.]

[25. A printing system according to claim 24 wherein said drawing means is operable to successively decompose one or more of the instructions from said source of drawing instructions into a list of simpler directions and store said list in said storage means, said drawing means being operable to numerically limit the instructions to keep said list within a designated size.]

[26. A printing system according to claim 25 wherein said two dimensional image comprises a plurality of contiguous bands and each of the image lines is allocated to a corresponding one of said bands, said drawing means being operable to scan the bands and restrict selection of said image lines to those allocated to a current one of said bands, said drawing means being operable to cyclically execute the directions of said list with a scope limited to storing pixels in the storage means for the image lines contained within the current one of said bands.]

[27. A printing method employing a storage means having a compressed region and an uncompressed region for printing from a source of drawing instructions a two dimensional image reducible to pixels arranged in a plurality of ranked image lines, comprising the steps of:

storing new pixels in said storage means for successively selected ones of said image lines by:

(a) compressively encoding and moving from said uncompressed region to said compressed region a remote one of said image lines, if (i) the selected one of said image lines is in said compressed region and (ii) said uncompressed region has reached its capacity;

(b) expansively decoding said selected one of said image lines, if located in said compressed region; and (c) inserting one or more new pixels according to said drawing instructions into said selected one of said image lines by storing said selected one in said uncompressed region; and printing said plurality of image lines in rank order, decompressing compressed ones of said image lines from said compressed region before printing.]

[28. A printing method according to claim 27 wherein the step of storing new pixels comprises the steps of:

successively decomposing one or more of the instructions from said source of drawing instructions into a list of simpler directions, while numerically limiting the instructions to keep said list within a designated size; and saving said list in said storage means.]

[29. A printing method according to claim 28 wherein said two dimensional image comprises a plurality of contiguous bands and each of the image lines is allocated to a corresponding one of said bands, the step of storing new pixels comprises the steps of:

scanning the bands and restricting selection of said image lines to those allocated to a current one of said bands; and cyclically executing the directions of said list with a scope limited to storing pixels in the storage means for the image lines contained within the current one of said bands.]

[30. A printing method according to claim 29 comprising the steps of:

overwriting the list of directions by decomposing and storing in said storage means unused ones of the instructions from said source of drawing instructions;

rescanning the bands and restricting selection of said image lines to those allocated to a current one of said bands; and again cyclically executing the latest ones of the directions with a scope limited to storing pixels in the storage means for the image lines contained within the current one of said bands.]

[31. A printing method according to claim 30 comprising the steps of:

compressively encoding said image lines at a chosen one of a plurality of encoding densities; and storing said image lines in said compressed region with a compression code signifying said chosen one of said encoding densities.]

[32. A printing method according to claim 31 comprising the step of:

sensing the compression code and in response thereto expansively decoding said selected one of said image lines with respect to said chosen one of said encoding densities.]

[33. A printing method according to claim 32 comprising the step of:

compressively re-encoding at least some of the image lines in said compressed region at a denser one of said densities, if said compressed region has reached its capacity.]

[34. A printing method according to claim 31 comprising the step of:

determining at least one of the characteristics of the image, said chosen one of said densities being selected in dependence upon said one of the characteristics of said image.]

[35. A printing method according to claim 31 wherein the step of storing said selected one of said image lines after decompression in said compressed region is performed by storing said selected one with an uncompressed code signifying a lack of compression, the step of printing being performed by storing said image lines in said storage means without a code signifying a lack of compression.]

[36. A printing method according to claim 31 wherein said storage means is volatile and has a total capacity insufficient to hold all of said image lines uncompressed, the densest one of said encoding densities having the capability of reducing the resolution of the two dimensional image and storing it at a density that enables storage in said storage means of all of said image lines, without regard to the number and arrangement of pixels in said image lines, so that nonvolatile memory is unneeded for storing said image lines.]

[37. A printing method according to claim 27 wherein the step of compressively encoding and moving is performed by encoding and moving from said uncompressed region to said compressed region said remote one of said image lines together with a plurality of other ones of said image lines, so that lines are moved in groups.]

[38. A printing method according to claim 37 wherein the step of expansively decoding is performed by decoding and moving from said compressed region to said uncompressed region said selected one of said image lines together with a plurality of other ones of said image lines, so that lines are moved in groups.]

[39. A printing method according to claim 27 further comprising the step of changing the ratio of the capacities of said compressed and said uncompressed regions by redesignating portions of one in favor of the other in response to the availability of storage space in one or more of the regions of said storage means.]

[40. A printing method according to claim 27 further comprising the steps of:

compressively encoding said image lines at a chosen one of a plurality of encoding densities; and moving said image lines to said compressed region with a compression code signifying said chosen one of said encoding densities; and changing the ratio of the capacities of said compressed and said uncompressed regions by redesignating portions of one in favor of the other in response to the choosing of the chosen one of said encoding densities.]

[41. A printing method according to claim 27 further comprising the step of:

changing the ratio of the capacities of said compressed and said uncompressed regions by redesignating portions of one in favor of the other in dependence upon the size of page to be printed.]

*42. A printing system for printing a two dimensional image comprising:*

*a memory having a compressed region and an uncompressed region and each region being arranged to store discrete portions of said image;*

*drawing means coupled to said memory, said drawing means being operable to store said discrete image portions in said memory, said drawing means including:*

*(a) conditional means for compressively encoding and moving discrete image portions from said uncompressed region to said compressed region;*

*(b) decompression means for expansively decoding discrete image portions, if located in said compressed region; and*

*(c) insertion means for inserting one or more discrete image portions into said image by storing a selected discrete image portion in said uncompressed region; and*

*printing means coupled to said memory for decompressing compressed ones of said discrete portions from said compressed region before printing.*

*43. A printing method employing a memory having a compressed region and an uncompressed region for printing a two dimensional image, the method comprising:*

*storing discrete portions of said image in said storage by:*

(*a*) *compressively encoding and moving from said uncompressed region to said compressed region at least one of said discrete image portions;*

(*b*) *expansively decoding a selected one of said discrete image portions, if located in said compressed region; and*

(*c*) *inserting one or more discrete image portions into said image by storing a selected discrete image portion in said uncompressed region; and*

*decompressing compressed ones of said discrete image portions from said compressed region before printing.*

* * * * *